J. E. MAGEE.
FLEXIBLE BEARING.
APPLICATION FILED JAN. 22, 1913.
1,086,830.
Patented Feb. 10, 1914.
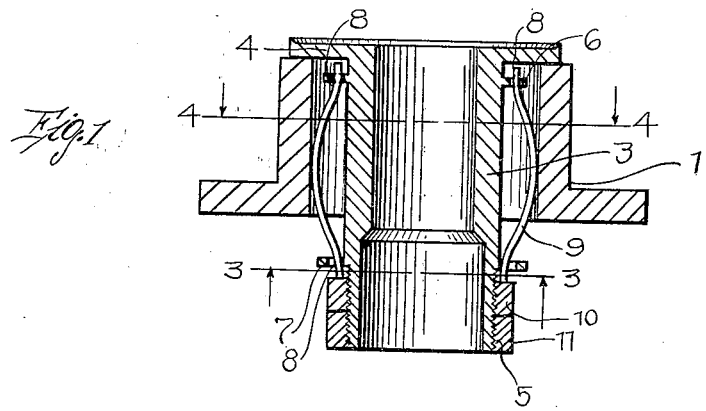
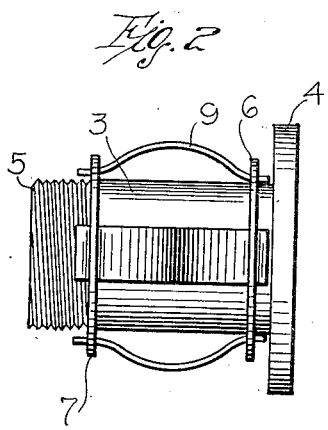
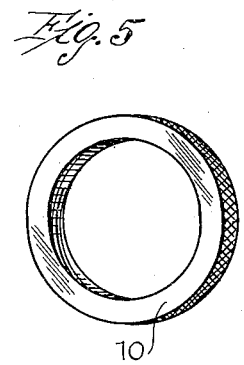
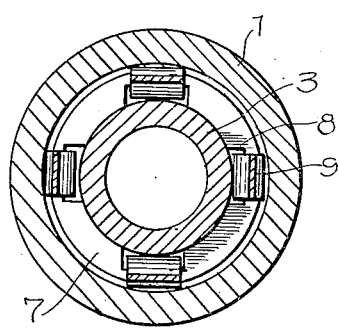
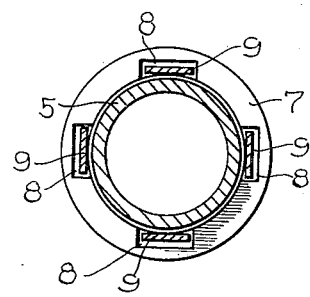
Inventor
J. E. Magee.
Witnesses
Robert M. Sutphen.
A. I. Hind.
By Watson E. Coleman,
Attorney

UNITED STATES PATENT OFFICE.

JOHN E. MAGEE, OF NEW HAMPTON, MISSOURI.

FLEXIBLE BEARING.

1,086,830.   Specification of Letters Patent.   Patented Feb. 10, 1914.

Application filed January 22, 1913. Serial No. 743,595.

*To all whom it may concern:*

Be it known that I, JOHN E. MAGEE, a citizen of the United States, residing at New Hampton, in the county of Harrison and State of Missouri, have invented certain new and useful Improvements in Flexible Bearings, of which the following is a specification, reference being had to the accompanying drawings.

This invention relates to new and useful improvements in flexible bearings and more particularly to a bearing of this type for use in connection with centrifugal separators and my object is to provide an elastic spring bearing for high-speed machines which will admit of the regulation of the tension of the spring.

A further object of the invention resides in providing a bearing having a singularity or plurality of outwardly bowed leaf springs applied thereto, which are adapted to contact with an outer casing on a stationary object and a still further object resides in providing means for the adjustment of the spring or springs, whereby the same will contact to a greater or lesser degree with the casing or frame of the machine in which the device is used.

Still another object of the invention resides in providing a device, the springs of which are disposed in position so that when adjusted through the medium of the adjusting means, the same will be forced outwardly at their centers from both ends thereof and a still further object resides in providing a device which is simple in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a vertical section through the bearing applied in a casing or the like. Fig. 2 is a side elevation of the bearing removed from the casing. Fig. 3 is a horizontal section as seen on line 3—3, of Fig. 1. Fig. 4 is a similar view as seen on line 4—4, of Fig. 1; and Fig. 5 is a perspective view of one of the bands or nuts used in connection with the bearing.

In describing my invention, I shall refer to the drawing in which similar reference characters designate corresponding parts throughout the several views and in which 1 indicates a casing or a portion of a frame having an opening therein and disposed through this casing or the like, is a bearing 3, the upper end of which is provided with an annular flange 4, said flange being adapted to rest on the upper peripheral edge of the casing or surrounding the frame 1. The upper face of this flange is slightly hollowed to form a substantial cup or the like, as clearly shown in Fig. 1 of the drawing. The extreme lower end of this bearing is externally threaded as shown at 5 and also formed on the bearing are the upper and lower flanges 6 and 7 respectively. The upper flange 6 is spaced slightly below the flange 4, while the lower flange 7 is provided just below the upper termination of the threads 5 and these flanges 6 and 7 are provided with alining slots 8 which are formed adjacent the junctions thereof with the body of the bearing. Disposed in the slots 8 of these flanges 6 and 7, are the ends of the outwardly bowed spring sections 9, the normal positions of said spring sections being such as to slightly space the upper ends of the same from the under face of the flange 4 on the bearing. Engaged with the threaded portion 5 of the bearing is an adjusting nut 10 which, when turned home on said bearing is adapted to engage the lower ends of the spring sections 9 which extend through the slots in the flange 7. When the nut 10 is turned on the threaded portion 5 to engage the lower ends of the spring sections, the latter are forced upwardly so as to permit the upper ends of the same to contact with the under face of the flange 4 and upon a continued turning of the nut, the sections of said springs will be forced outwardly under pressure from both ends thereof. A jam nut 11 of similar design and size to the nut 10 is also provided for engagement with the threaded portion 5 to lock the nut 10 in any adjusted position.

As stated above, this device is particularly adapted for use in connection with centrifugal separators such as cream separators wherein bowls are carried on the upper ends of the shaft which is adapted to extend through this bearing. It will thus be seen that when this bearing with the shaft extending therethrough is properly disposed in the casing or outer frame, a slight elasticity will be given to the bowl as the same is rotated at high-speed, thus preventing the shaft from running hard and causing undue wear on the bearing. The bowl carried on the shaft which is adapted to extend through this bearing is, of course, balanced and this spring is, furthermore, intended to counteract any deviation in the balance of the bowl, thereby removing any vibration from the bowl that would otherwise occur but for this spring tension means. It will further be seen that through the medium of the adjusting means, the tension of these springs may be adjusted for obvious purposes.

While I have particularly described a plurality of spring sections in connection with this bearing to form a spring tension means therefor, it will be understood that a single member may be provided with a plurality of bowed spring tongues or prongs thereon, but the means shown in the drawing and described in the specification is most preferable. It will also be understood that various changes in form, proportion and in the minor details of construction may be resorted to without departing from the spirit or sacrificing any of the principles of the invention.

Having thus described this invention, what I claim is:—

1. In a flexible bearing, the combination with a casing; of a bearing loosely disposed therethrough and having an annular flange at its upper end resting on said casing, and additional flanges formed on said bearing and spaced one from the other, outwardly bowed spring sections loosely disposed through the last mentioned flanges, and means to bulge the central portions of said springs to a greater degree by pressure at both ends thereof, whereby the same will frictionally bind against the inner wall of said casing.

2. In a flexible bearing, the combination with a casing; of a bearing loosely disposed therethrough and provided with an annular flange on its upper edge resting on the upper face of the casing, a pair of spaced flanges also formed on said bearing adjacent the upper and lower ends thereof respectively, said last mentioned flanges being provided with alining slots, a plurality of outwardly bowed spring sections having the ends thereof loosely disposed through the alining slots of said additional flanges, and means engaged with the lower end of said bearing adapted for engagement with the lower ends of said spring sections to bulge the latter centrally whereby to bind frictionally against the inner wall of said casing.

3. In a flexible bearing, the combination with a casing; of a bearing loosely disposed therethrough and provided with an annular flange on its upper edge adapted to rest on said casing, the lower end of said bearing being externally threaded, a pair of annular flanges also formed on said bearing adjacent the upper and lower ends thereof respectively, said latter flanges being provided with alining slots, a plurality of outwardly bowed spring sections having the ends thereof loosely disposed through the aforesaid slots in said flanges, the upper ends of said spring sections being adapted to contact with the under face of the first mentioned flange when said springs are forced upwardly, a nut engaged with the threaded end of said bearing adapted to contact with the lower ends of said springs to force the same upwardly and correspondingly bulge the same centrally to cause the latter to frictionally engage the inner wall of the casing, and means to lock the nut in any adjusted position.

In testimony whereof I hereunto affix my signature in the presence of two witnesses.

JOHN E. MAGEE.

Witnesses:
W. A. DENNY,
W. F. CLABAUGH.

---

Copies of this patent may be obtained for five cents each, by addressing the "Commissioner of Patents, Washington, D. C."